US011951067B2

(12) United States Patent
Brockway et al.

(10) Patent No.: US 11,951,067 B2
(45) **Date of Patent: *Apr. 9, 2024**

(54) DUAL RECEPTACLE CARRIER

(71) Applicant: Medline Industries, LP, Northfield, IL (US)

(72) Inventors: Todd Brockway, Vernon Hills, IL (US); Emily Berman, Park Ridge, IL (US); Caren Wax, Deerfield, IL (US); Tambra Martin, Trevor, WI (US); William Elliott Brooks, Chicago, IL (US); Robert W. Sheldon, Winnetka, IL (US); Gregory J. Foster, Chicago, IL (US)

(73) Assignee: Medline Industries, LP, Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,541

(22) Filed: May 1, 2023

(65) Prior Publication Data

US 2023/0285218 A1 Sep. 14, 2023

Related U.S. Application Data

(63) Continuation of application No. 17/747,308, filed on May 18, 2022, now Pat. No. 11,672,723, which is a continuation of application No. 17/232,255, filed on Apr. 16, 2021, now Pat. No. 11,364,171, which is a continuation of application No. 16/782,451, filed on Feb. 5, 2020, now Pat. No. 10,993,870, which is a continuation of application No. 16/037,779, filed on Jul. 17, 2018, now Pat. No. 10,588,812.

(60) Provisional application No. 62/537,817, filed on Jul. 27, 2017.

(51) Int. Cl.
*A61H 3/00* (2006.01)
*A61H 1/00* (2006.01)

(52) U.S. Cl.
CPC ................. *A61H 3/00* (2013.01); *A61H 1/00* (2013.01); *A61H 2003/002* (2013.01); *A61H 2201/1635* (2013.01)

(58) Field of Classification Search
CPC ............. Y10S 224/926; Y10S 224/929; B62B 2202/023; B62B 3/1472; B60N 3/103; B60N 3/107; B60N 3/105; B60N 3/108; A61H 2003/002
USPC ......................................... 224/407, 926, 929
See application file for complete search history.

(56) References Cited

U.S. PATENT DOCUMENTS 5,628,486 A * 5/1997 Rossman ............... B60N 3/107
248/311.2
8,500,076 B2 * 8/2013 Lai ............................ B62B 9/26
248/102

FOREIGN PATENT DOCUMENTS

JP 2000185588 7/2000

* cited by examiner

*Primary Examiner* — Adam J Waggenspack
(74) *Attorney, Agent, or Firm* — Fitch, Even, Tabin & Flannery LLP

(57) ABSTRACT

Disclosed is a dual-receptacle carrier that is generally configured for attachment to a rollator or walker and that is configured to retain either a beverage or a mobile device, such as a cellular telephone. The device comprises a body, a base, and first and second opposing retention arm portions that are configured as a receptacle for a beverage. The first and second opposing retention arm portions and base include recesses that define a receptacle for an electronic device.

18 Claims, 10 Drawing Sheets

DUAL RECEPTACLE CARRIER

CROSS-REFERENCE TO RELATED APPLICATIONS

This application is a continuation of U.S. patent application Ser. No. 17/747,308, filed on May 18, 2022, which is a continuation of U.S. patent application Ser. No. 17/232,255, filed on Apr. 16, 2021, which is a continuation of U.S. patent application Ser. No. 16/782,451, filed on Feb. 5, 2020, which is a continuation of U.S. patent application Ser. No. 16/037,779, filed on Jul. 17, 2018, which claims the benefit of U.S. Provisional Application No. 62/537,817, filed Jul. 27, 2017, each of which is incorporated herein by reference in their entireties.

BACKGROUND

Walkers, rollators, and other mobility-assisting devices are commonly used by the elderly and by others with limited physical mobility. It is known to provide various accessories for such mobility-assisting devices. For instance, the prior art has provided accessories such as seats and cup holders.

Now, a dual-receptacle carrier has been devised, the carrier being attachable to a mobility-assisting device such as a walker or rollator and being equipped to retain either a beverage or a mobile device, such as a cellular telephone. Generally, the carrier comprises a body having a base, an extension, and first and second opposing retention arms or arm portions that cooperate with the base to form a beverage receptacle. The arm portions are each provided with an arm portion recess and the base portion is provided with a base recess, these recesses cooperating to form a receptacle for an electronics device. The body is generally pivotable relative to a mounting bracket to enable the user to adjust the operating angle of the device. Desirably, the device is equipped with a quick-release mechanism to allow the user to adjust the position of the device along a tube structure of a walker or rollator.

DETAILED DESCRIPTION

Figure 1:
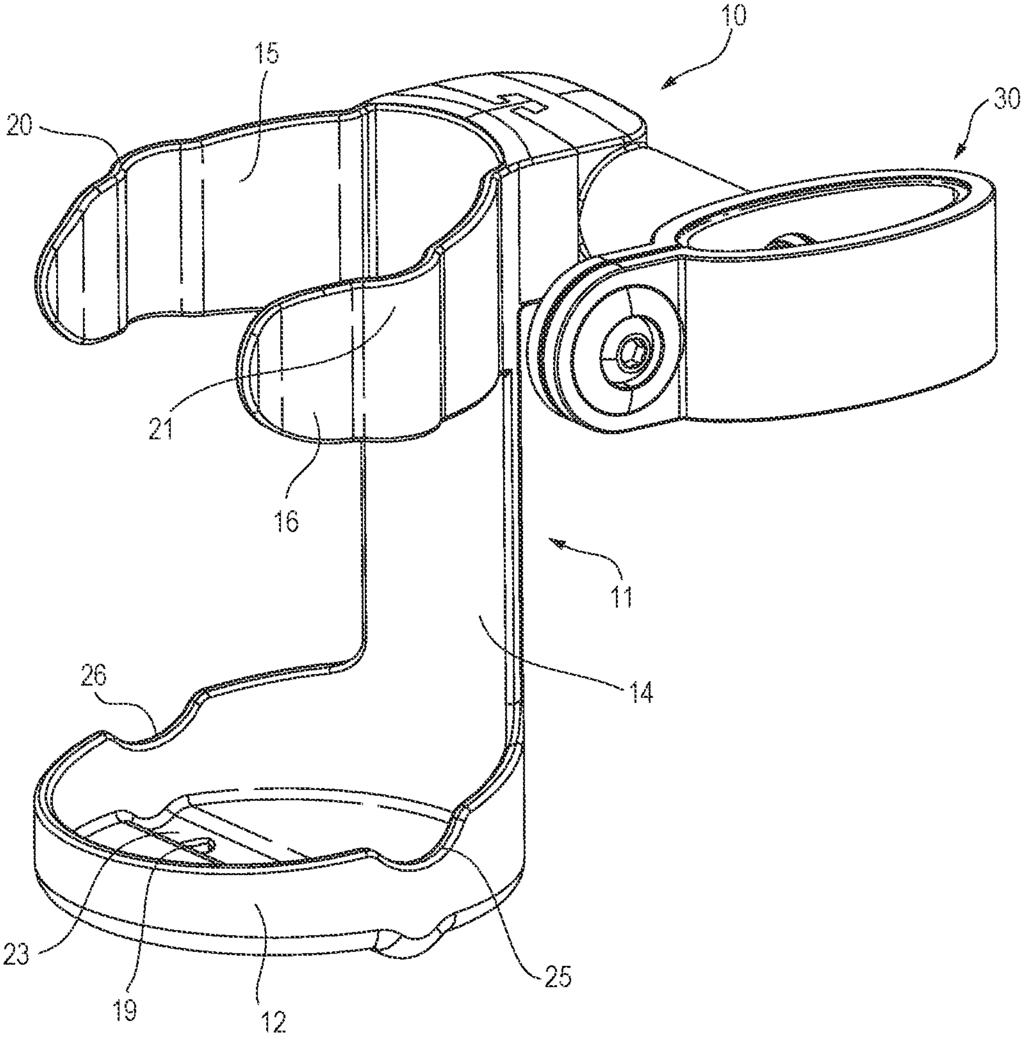
FIG. 1 is a perspective view of an exemplary dual-receptacle carrier in accordance with one embodiment.
Figure 2:
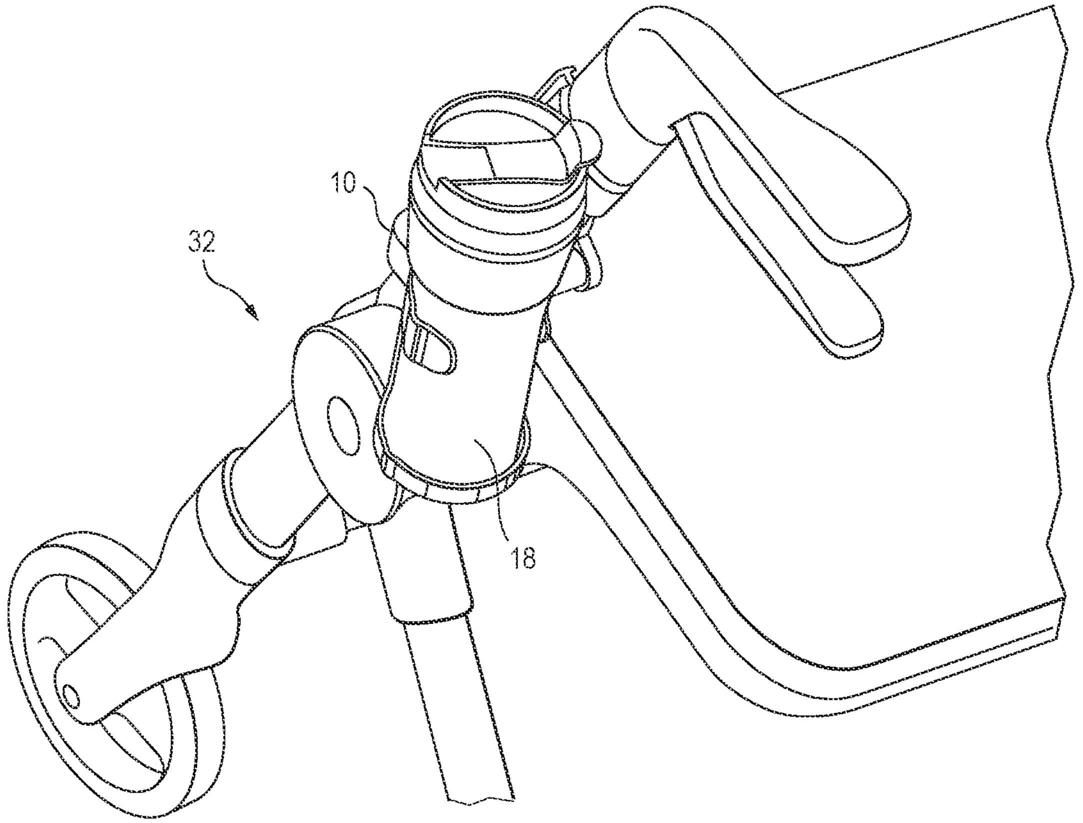
FIG. 2 is a perspective view illustrating use of the carrier of FIG. 1 mounted onto a rollator and in use as a receptacle for a beverage.

With reference now to FIG. 1, the illustrated carrier 10 includes a body 11 having a base 12 and an extension 14 that separates the base 10 from an upper region. The upper region includes first and second generally curved opposing retention arm portions 15, 16. As illustrated, the arm portions 15, 16 comprise separate retention arms, although in practice a single curved band may be employed. As is conventional, the first and second retention arms and base cooperate to form a beverage receptacle, as best seen in FIG. 2. With reference to FIG. 2, a beverage is disposed in a suitable vessel, such as the illustrated mug 18. The mug 18 rests on the base 12 and is retained on the base via the retention arms 15, 16. Weep holes 19 (seen also FIG. 4) allow for drainage of any condensate from the beverage.

Figure 3:
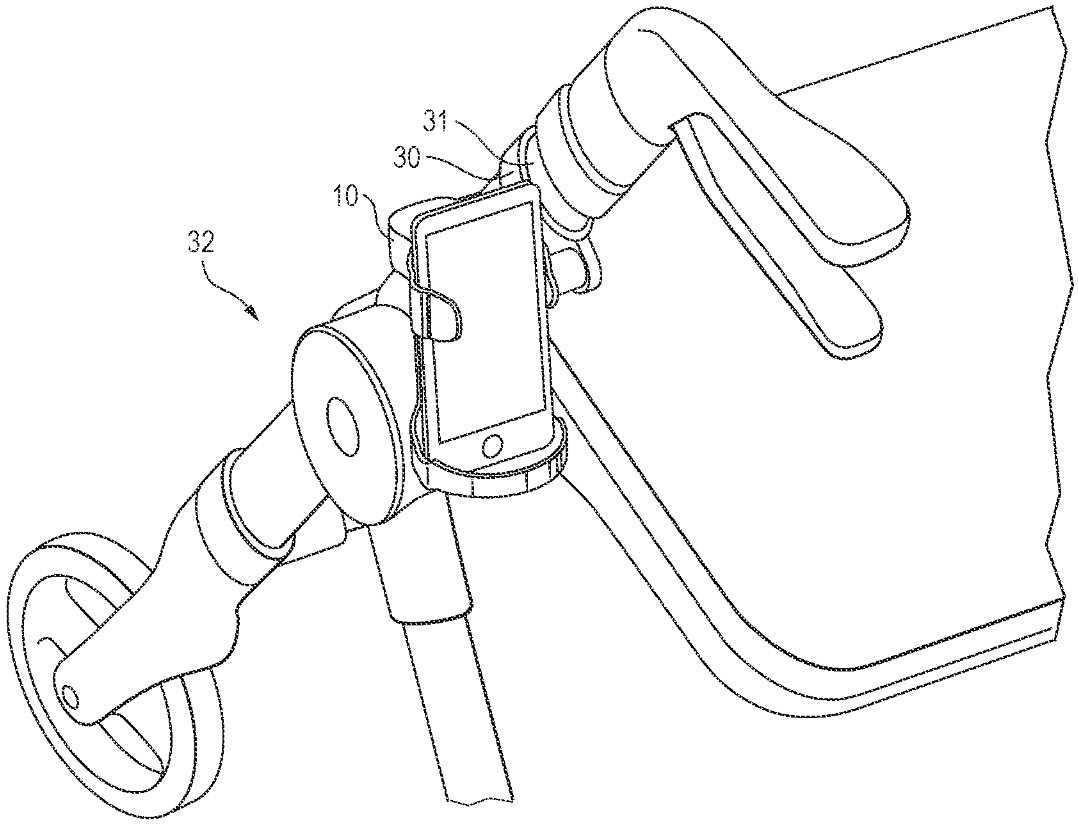
FIG. 3 is a perspective view illustrating use of the carrier of FIG. 1 mounted onto a rollator and in use as a receptacle for a cellular telephone.

With further reference to FIG. 1, the first retention arm 15 includes a first recess 20 and the second retention arm 16 includes a second recess 21, these cooperating to form a slot. This slot is aligned with and cooperates with a recess 23 disposed on the base to form a receptacle for an electronic device, as best seen in FIG. 3. The base further includes a pair of base cutouts 25, 26. The cutouts 25, 26 can accommodate larger electronic devices placed within the retention arm portions 15, 16, which are resilient and which can be biased slightly outwardly (not shown) when necessary to accommodate such larger electronic devices.

Figure 4:
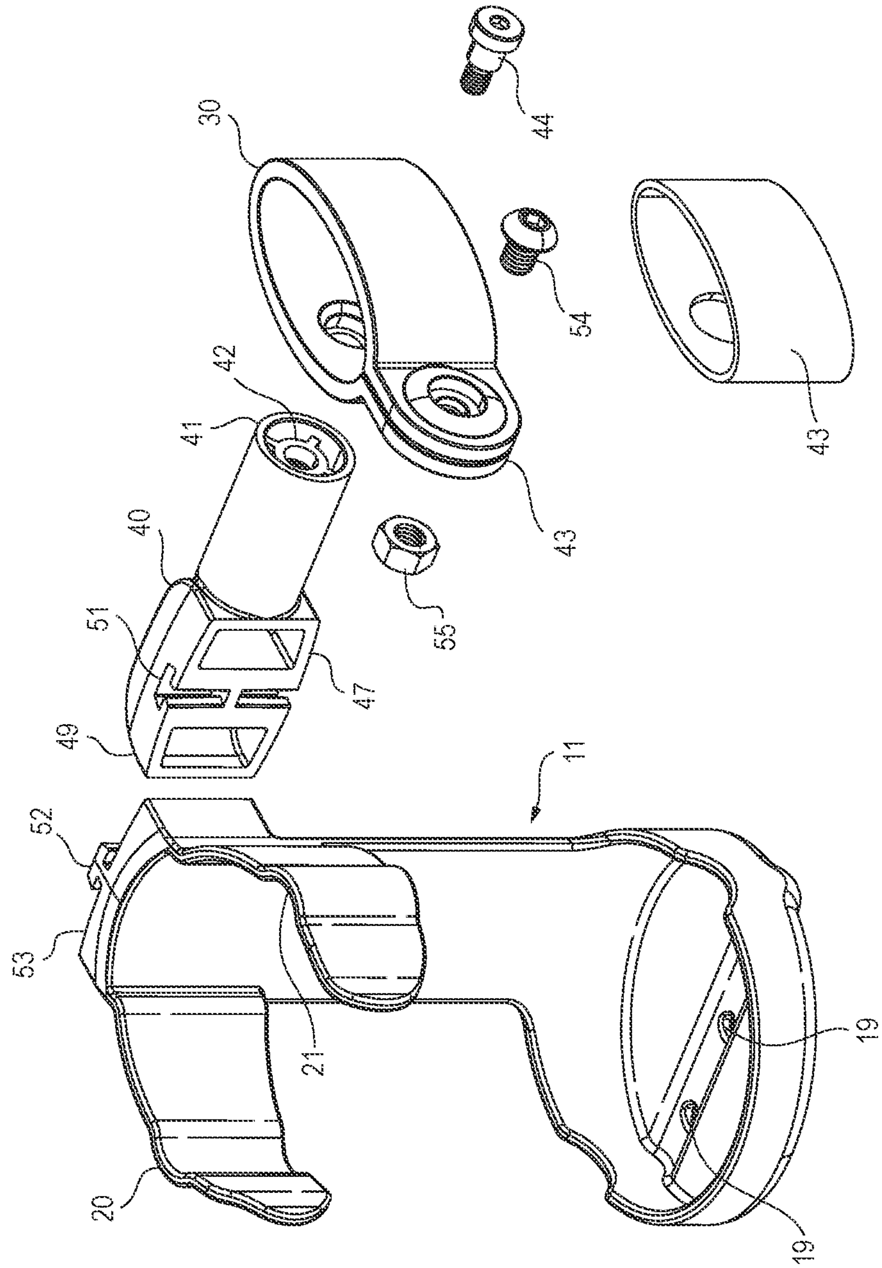
FIG. 4 is a front exploded view of the device shown in FIG. 1.

The carrier includes a bracket 30 for mounting to a tubular frame portion 31 of the rollator 32 as shown in FIGS. 3 and 4. The bracket may be mounted to other frame portions of the rollator. As illustrated, the bracket has an oval shape to accommodate the oval-shaped tubular frame portion 31 of the rollator 32. Many mobility devices are composed of tubular frame portions having a circular cross section, and the bracket may be correspondingly shaped when intended for use with such mobility devices.

Figure 4A:
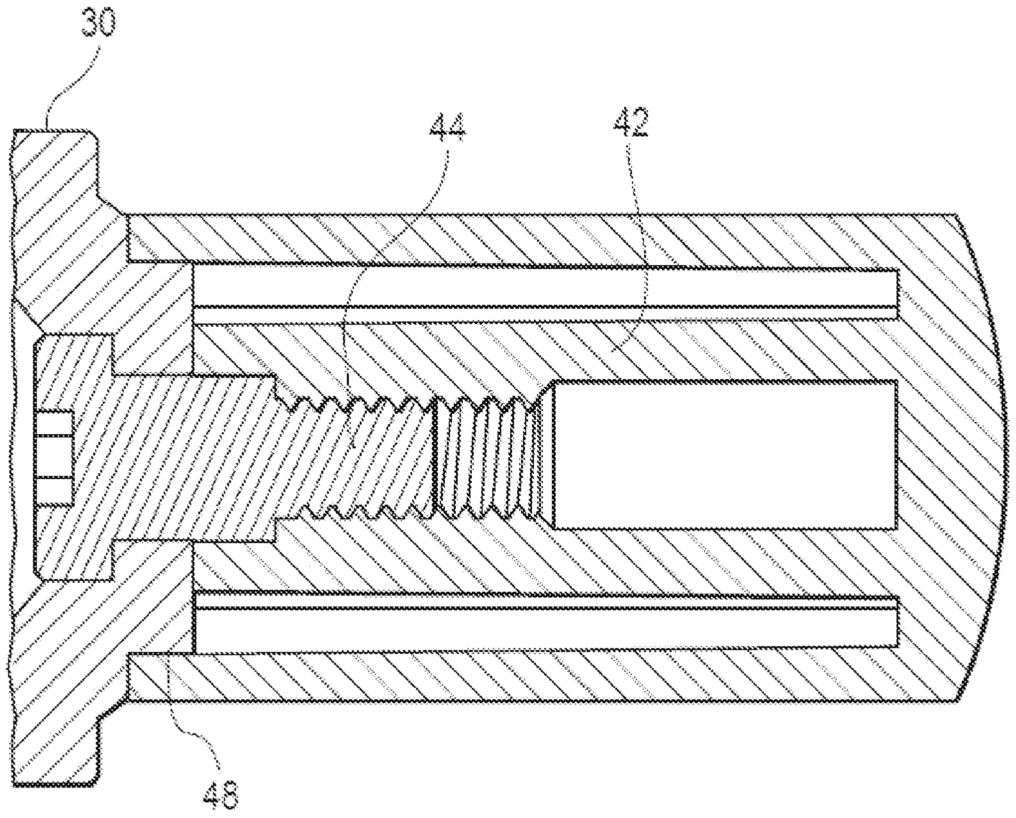
FIG. 4A is a relatively enlarged top view in cross section of a portion the device shown in FIG. 1 when mounted onto a tubular frame member of a mobility device.
Figure 5:
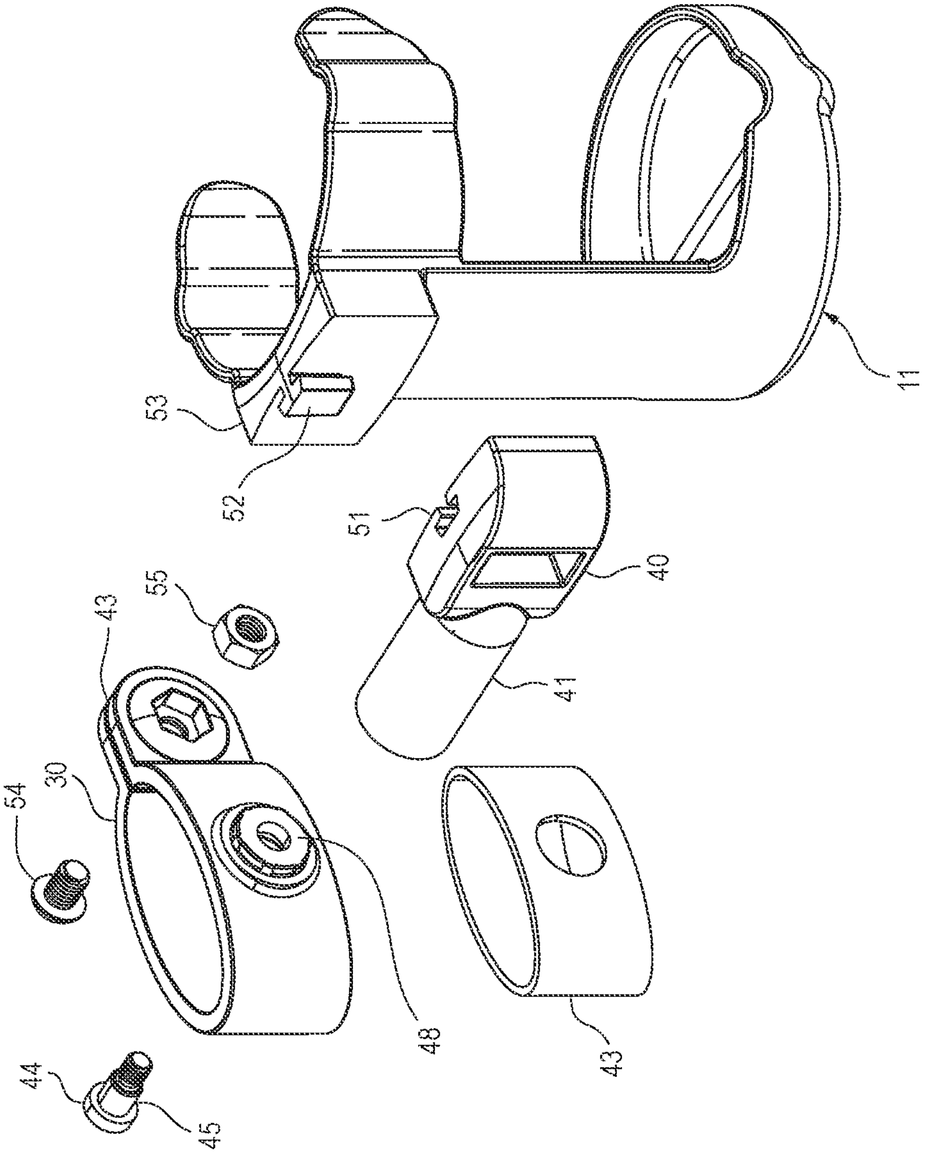
FIG. 5 is a rear exploded view of the device shown in FIG. 1.

The body may be pivoted with respect to the bracket to allow the user to adjust the angle of the body portion. The pivoting mechanism is best explained with respect to FIGS. 4, 4A, and 5, which show the body 11 and bracket 30 and a shaft coupler 40. The shaft coupler 40 has a base end 41 having a socket 42 (FIG. 4 only) that receives a mounting screw 44. This is seen also in FIG. 4A. The internal surface 45 (FIG. 5 only) of the head of the screw 44 frictionally engages the socket 42 to accommodate rotation of the base end 41 of the shaft coupler 40 with respect to the bracket 30. Additionally, a friction ring 48 is snugly received within a hollow at the base end 41 of the shaft coupler 40. The shaft coupler has a body mounting region 49 that includes a radial face 47. The radial face 47 includes a socket portion 51 that cooperates with a plug portion 52 that is disposed on a coupler mounting region 53 of the body 11. The plug and socket portions may be reversed (not shown) such that the plug portion is disposed on the shaft coupler and the socket portion is disposed on the body. When the plug and socket portions are engaged, the body 11 is fixed with respect to the shaft coupler 40, such that, when the shaft coupler 40 rotates at its base 41, the body 11 is thereby caused to pivot with respect to the bracket 30.

As shown in FIG. 4, the bracket 30 is equipped with a retaining nut 54 and bolt 55 for purposes of mounting the bracket to the mobility device. An optional elastomeric gasket 43 (FIGS. 4 and 5 only) may be provided to enhance the stability of the device.

Figure 6:
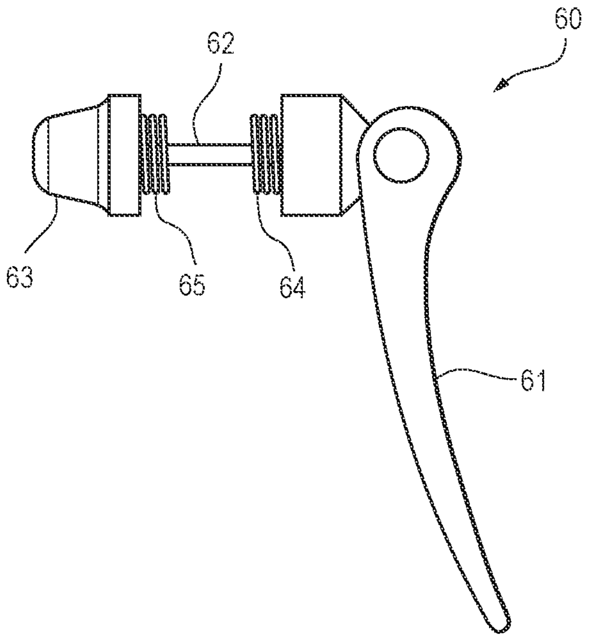
FIG. 6 is a perspective view of a quick-release mechanism useful in connection with the device of FIG. 1.

In an alternative embodiment, the quick release mechanism 60 shown in FIG. 6 may be employed. This mechanism allows a frictional fit of the bracket 33 onto the tubular frame of the mobility device. This mechanism 60 comprises a handle 61, shaft 62, tension-adjusting nut 63, and springs 64, 65. When a user lifts the handle 61, the frictional fit of the bracket to the tubular device will relax, thereby permitting the user to slide the bracket along the tubular frame of the mobility device. The quick-release device may be completely removed by unthreading the tension-adjusting nut 63 to allow installation or removal of the bracket.

Figure 7:
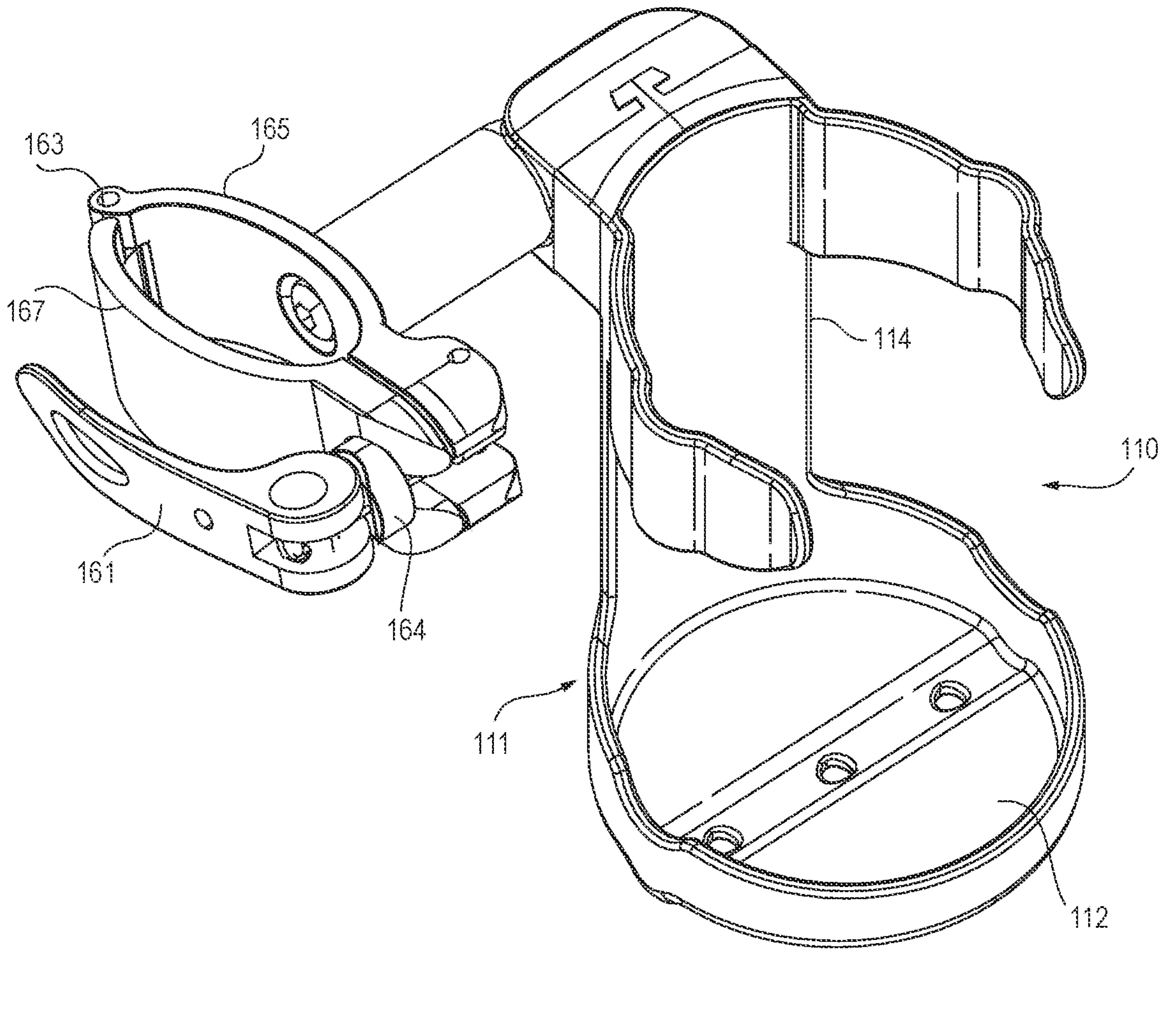
FIG. 7 is a perspective view of an alternative embodiment of a dual-receptacle carrier, showing a quick-release lever in an engaged position.
Figure 8:
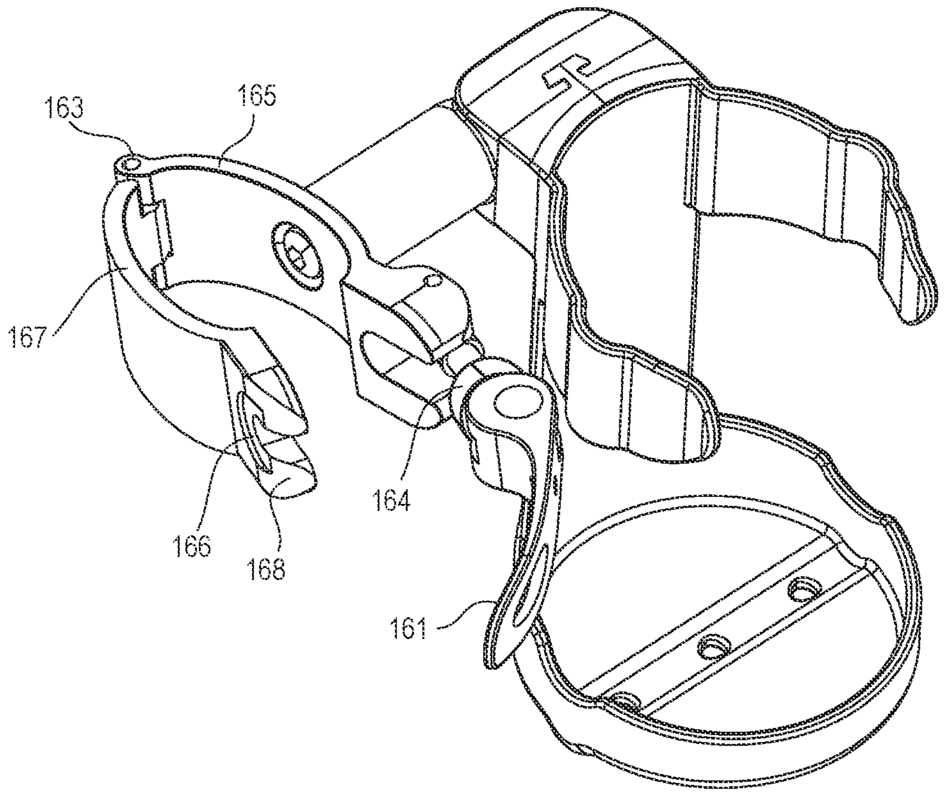
FIG. 8 is a perspective view of the carrier shown in FIG. 7, illustrating the quick-release lever in a disengaged position.

With reference now to the carrier 110 shown in FIG. 7, the body 111, base 112, and extension 114 are generally similarly configured to those of the carrier depicted in FIG. 1. In the illustrated embodiment, a quick-release lever 161 is pivotally mounted to a first bracket portion 165 of bracket 130, which is connected to the second bracket portion 167 at a hinge 163. A locking member 164 (FIG. 7) may be provided to ensure proper fitting of the bracket 130 onto a tubular frame portion of a rollator or other mobility-assisting device, whereby the end of the lever operates as a cam to bias the locking member and to thereby firmly secure the first and second bracket portions 165, 167. This locking member 164 is received in a recess 166 (FIG. 8) of the second bracket portion 168. Optionally, the locking member may comprise or include a compressible material or spring.

When engaged, the quick release mechanism secures the first and second bracket portions 165, 167 to one another to thereby frictionally secure the carrier to the tubular frame of the mobility-assisting device. When disengaged, the quick-release mechanism permits attachment or removal of the carrier, and also permits adjustment of the axial position of the carrier on the tubular frame portion.

Figure 9:
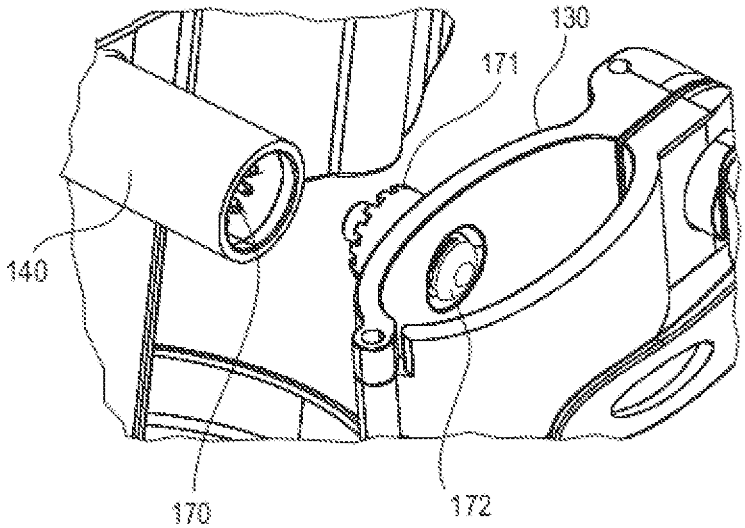
FIG. 9 is a perspective view of the shaft coupler and bracket of the carrier shown in FIG. 7.
Figure 10:
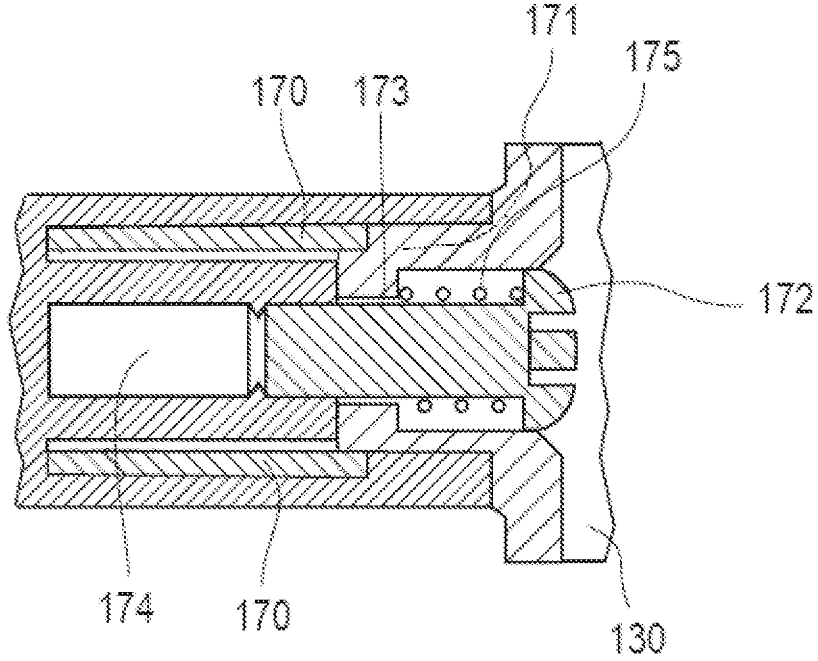
FIG. 10 is a top view in partial cross-section illustrating the connection between the shaft coupler and bracket of the carrier shown in FIG. 7.

With reference now to FIGS. 9 and 10, the shaft coupler 140 is equipped with plural splines 170 that engage a series of indexing nubs 171 disposed on the bracket 130. A securement bolt 172 is contained in a sleeve 173 and received in a socket 174 (FIG. 10). The construction is equipped with a compression spring 175 that normally biases the bolt 172 in the direction of the shaft coupler 140 to cause the splines 170 to engage the nubs 171 to thereby inhibit relative rotation of the bracket 130 and shaft coupler 140. The splines 170 and nubs 171 operate together to create an indexing mechanism that allows the body 111 to rotate in an indexed manner relative to the bracket 130. More specifically, when it is desired to rotate the body 111 relative to the bracket 130, the user exerts a pulling force to separate the body 111 and bracket 130 to temporarily disengage the splines and indexing nubs. After rotating the body to the desired indexed position, the user releases the pulling force. Expansion of the spring 175 biases the bracket 130 and body 111 towards one another, thereby causing re-engagement of the splines and indexing nub. The bolt 172 remains affixed within the socket 174, allowing the nubs 171 to translate along the sleeve 173 as the splines 170 and nubs 171 are brought into and out of engagement.

As illustrated, the recesses in the arm portions are generally axially aligned with the recess in the base. In an alternative embodiment (not shown) the recesses in the arm portions may be slightly rearwardly offset relative to the base surface and angled at a slight oblique angle. This will result in carriage of a retained electronic device at an angle, such that the device may be carried generally facing upwardly with the screen of the device pointed towards the user's eyes. In this configuration, the base may be oriented to be level with respect to the ground, such that a beverage will be retained in an upright position even though the device will be in a more user-readable position.

The carrier may be made of any suitable material, such as polypropylene.

It is therefore seen that the foregoing teachings provide a dual-receptacle carrier that can accommodate both a beverage and a cellular telephone or other electronic device. The carrier can be used on a conventional walker or rollator, or other mobility-assisting device.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A mobility-assisting device comprising:

a user-supporting frame including a user-gripping handle; and a carrier device mounted to the frame proximal the handle, the carrier device including:

a base and an extension portion, two opposing arm portions extending from the extension portion and opposed to the base; the arm portions having opposing discontinuities cooperating to form a slot therebetween;

the base including a first recess and a second recess within the first recess, the second recess aligned with the slot.

2. The mobility-assisting device of claim 1, wherein the second recess has a length at least as long as the slot.

3. The mobility-assisting device of claim 1, wherein the slot can expand to different sizes depending on a width of an object inserted therein.

4. The mobility-assisting device of claim 1, wherein the base includes an upper rim having two opposing recesses.

5. The mobility-assisting device of claim 4, wherein the two opposing recesses are aligned with the second recess.

6. The mobility-assisting device of claim 1 further including a bracket for mounting the carrier device to one of the frame, the bracket having a first bracket portion and a second bracket portion connected via a hinge, the bracket including a cam lever pivotally mounted to the first bracket portion and a locking member received in a recess of the second bracket portion, wherein pivoting the cam lever secures the first and second bracket portions to frictionally secure the carrier device to the frame.

7. The mobility-assisting device of claim 1 further comprising a tubular mounting bracket fixing the carrier device to the frame and a pivoting mechanism enabling the carrier device to pivot with respect to the mounting bracket.

8. The mobility-assisting device of claim 7 wherein the pivoting mechanism comprises a shaft coupler, the shaft coupler having a base end rotatably mounted with respect to the mounting bracket and a body mounting region, the body mounting region cooperating with a coupler mounting region disposed on the body.

9. The mobility-assisting device of claim 8 wherein one of the body mounting region and the coupler mounting region includes a plug portion and the other of the body mounting region and the coupler mounting region comprises a socket portion, the plug portion cooperating with the socket portion for fixing the body relative to the shaft coupler.

10. The mobility-assisting device of claim 9 wherein one of the mounting bracket and the shaft coupler includes plural splines and the other of the mounting bracket and the shaft coupler includes plural indexing nubs thereby permitting indexed rotation of the shaft coupler relative to the mounting bracket, the device including a spring normally biasing the indexing nubs and splines into an engaged position.

11. A carrier device comprising:

a body having a base and an extension portion; and first and second opposing retention arm portions extending from the extension portion and opposing the base, the retention arm portions having a discontinuous inner surface, the discontinuous inner surfaces cooperating to form a slot therebetween;

the base including a floor and an upstanding rim extending from and about the floor, the floor including a notch that cooperates with the slot to define a first receptacle.

12. The carrier device of claim 11, wherein the notch spans an inner diameter of the base.

13. The carrier device of claim 11, wherein the notch has a length that is at least as long as a length of the slot.

14. The carrier device of claim 11, wherein the discontinuous inner surfaces are offset relative to the notch.

15. The carrier device of claim 11, the retention arm portions having a discontinuous outer surface.

16. The carrier device of claim 11, wherein the base further comprises opposing notches in the rim that cooperate with the slot to define a second receptacle.

17. A mobility device comprising a user-supporting frame having at least one user-gripping portion, the user-supporting frame including at least one tubular section and the carrier device of claim 11 mounted to the tubular section.

18. The mobility device of claim 17, further comprising a tubular mounting bracket mounting the carrier device to the tubular section and a pivoting mechanism enabling the body to pivot with respect to the mounting bracket.

* * * * *